J. H. Mayo.

Constructing Houses.

No. 3,088. Reissued Aug. 18, 1868.

Witnesses:
Ch. B. Deming
H. Gle. Burton

Inventor:
John H. Mayo
By Hughes
Atty

H. PETERS, PHOTO-LITHOGRAPHER, WASHINGTON, D. C.

BEST AVAILABLE COPY

United States Patent Office.

JOHN K. MAYO, OF NEW YORK, N. Y., FOR HIMSELF, AND ANDRE CUSHING AND GEORGE CUSHING, OF ST. JOHN, NEW BRUNSWICK, ASSIGNEES OF JOHN K. MAYO.

*Letters Patent No.* 51,735, *dated December* 26, 1865; *reissue No.* 3,088, *dated August* 18, 1868.

DIVISION D.

IMPROVEMENT IN THE CONSTRUCTION AND FINISHING OF HOUSES AND OTHER BUILDINGS.

The Schedule referred to in these Letters Patent and making part of the same.

TO ALL WHOM IT MAY CONCERN:

Be it known that JOHN K. MAYO, formerly of Portland, Maine, but now of the city, county, and State of New York, invented an Improvement in the Construction and Finishing of Houses and other Buildings; and it is hereby declared that the following is a sufficiently full, clear, and exact description thereof to enable one skilled in the art to which the said invention appertains to carry it into effect, reference being had to the accompanying drawings which are made part of this specification.

This invention consists in constructing houses and other buildings, or parts thereof, from a plurality of scale-boards or thin sheets of wood firmly united together by cement, or its equivalent, the several layers being so placed together that the joints of one layer shall be broken by the next, and so that the grains of the wood shall be crossed or diversified, thus forming a material of great strength and tenacity, not subject to checking or splitting in its own nature, nor yet by any fastening which may be used in connecting its parts, neither will it be subject to swelling and shrinking like woods in their natural forms, nor, like metals, subject to expansion or contraction.

In building a house, it is proposed to substitute sheets or boards of thin laminated wood for all the usual covering of buildings outside and in.

Figure 1:
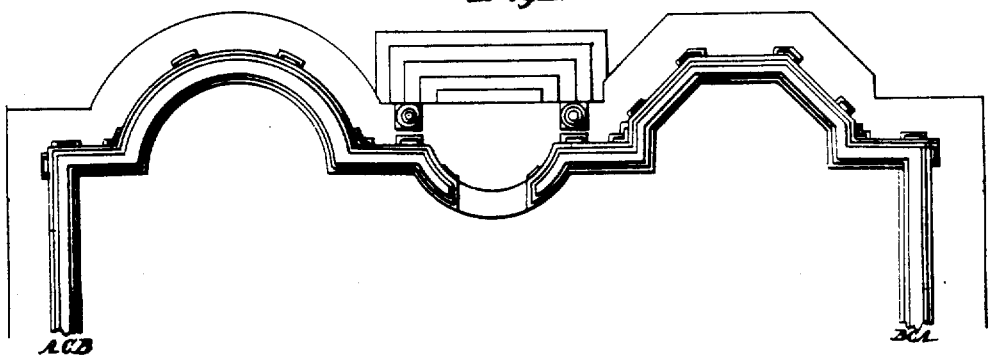

Figure 1 represents a portion of the walls of a house, formed of an outer shell, A, and an inner shell, B, made of sheets or boards of laminated scales, the outer shell serving the purpose of boarding and sheathing or clapboarding, and the inner one that of lathing and plastering, being separated by common inch boards, C, which serve the purpose of the usual framing, which may be dispensed with, as the material has sufficient strength in itself.

It may be found desirable to substitute T-pieces or angle-pieces made of the same laminated wood, in place of the boards C.

The finish and style of the house, both inside and out, may be made to suit the taste, either flush and plain, by tonguing and grooving its plates or sheets, or by covering the joints by pilasters of same material, as shown in the drawing. In either case the house will be perfectly tight, and impervious to wet and cold through its joints.

In mild climates, the inner wall might be dispensed with, and sufficient stiffness imparted to the outer wall by projections and recesses, adding beauty to the structure.

One great advantage of this form of building is, that the parts may be all made and fitted in the shop or factory, ready for setting up, and may be transported with facility to distant countries at less cost than ordinary building-materials, and put together with very little labor, one-half inch in thickness of this material being stronger than a two-inch plank. For this reason, also, owing to its superior strength and lightness, it is peculiarly adapted to the construction of domes, spires, towers, light-houses, or any structure of great height and elevation.

Figure 2:
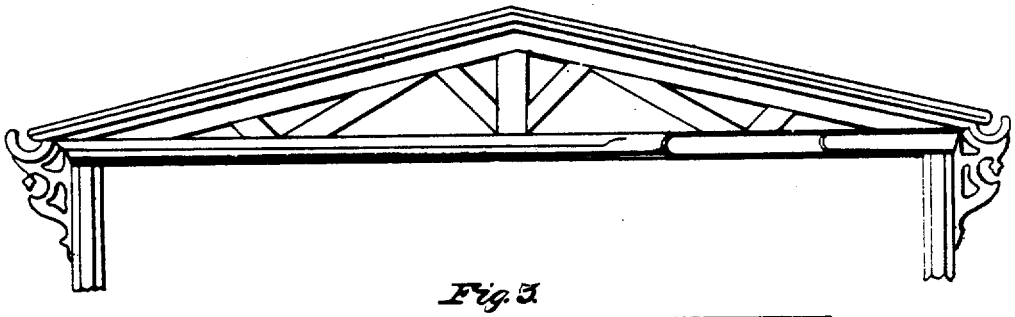

Figure 2 represents a section of roofing with perfectly plain surface, the laminæ or scale-boards being shown as laid in the ordinary boarding in one continuous web, the sheets or scales of wood being treated with cement, and laid down in succession, and external pressure applied to make them adhere to each other, after which, as protection against the weather or from fire, a coating of coal-tar and sand or analogous substance is applied. Another method quite as good, if not superior, is to manufacture the boarding of laminæ in the shop, and substitute the ordinary boarding with these upon the rafters either by butting or lapping, and then covering the joints with a coating of paint or coal-tar and sand or gravel, as now practised. The great advantage of this description of roofing is that it will neither swell by heat nor shrink by cold, and thus we overcome the great difficulty of all roofing.

Figure 3:
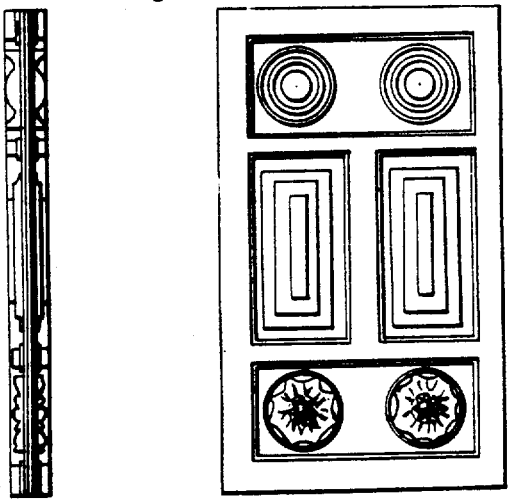

Figure 3 represents a door with raised panel-work, which is moulded by laying the laminæ of the compound scale-boards over or within suitable forms. The pliability of the material makes it very convenient and valuable for use in this manner.

BEST AVAILABLE COPY

Without specifying all the various uses and advantages of this invention as applied to architecture, it will suffice to say that it is proposed to use it in the construction and finishing of all kinds of buildings or any parts thereof.

In addition to the parts of buildings already specified, the invention is applicable to the construction of roofing and materials of various forms, eaves-troughs, spouts, gutters, columns, beams, girders, joists, flooring, stair-rails, balusters, newel-posts, mouldings, fruit and meat-chambers, cellars, refrigerators, window-frames, blinds, brackets, pillars, posts, arches, ventilators. But it is unnecessary to particularize further; suffice it to say, this material may be used to advantage in architectural structures, either for use or ornament, in whole or in part, and will be found superior in point of health, comfort, and cheapness.

The following is what it is desired to secure by Letters Patent as the invention of JOHN K. MAYO:

The employment or use of the compound scale-board, hereinbefore described, in the construction and finishing of houses and other buildings, or parts thereof.

JOHN K. MAYO.

Witnesses:

EDWARD WILLARD,

S. W. FROST.